March 2, 1954

J. K. KULANSKY

SELECTIVE CALLING SYSTEM 2,671,167

Filed Dec. 21, 1946

4 Sheets-Sheet 1

INVENTOR.
Jack Kendal Kulansky

BY Moses, Nolte, Crews & Berry
ATTORNEYS

March 2, 1954
J. K. KULANSKY
2,671,167
SELECTIVE CALLING SYSTEM
Filed Dec. 21, 1946
4 Sheets-Sheet 2
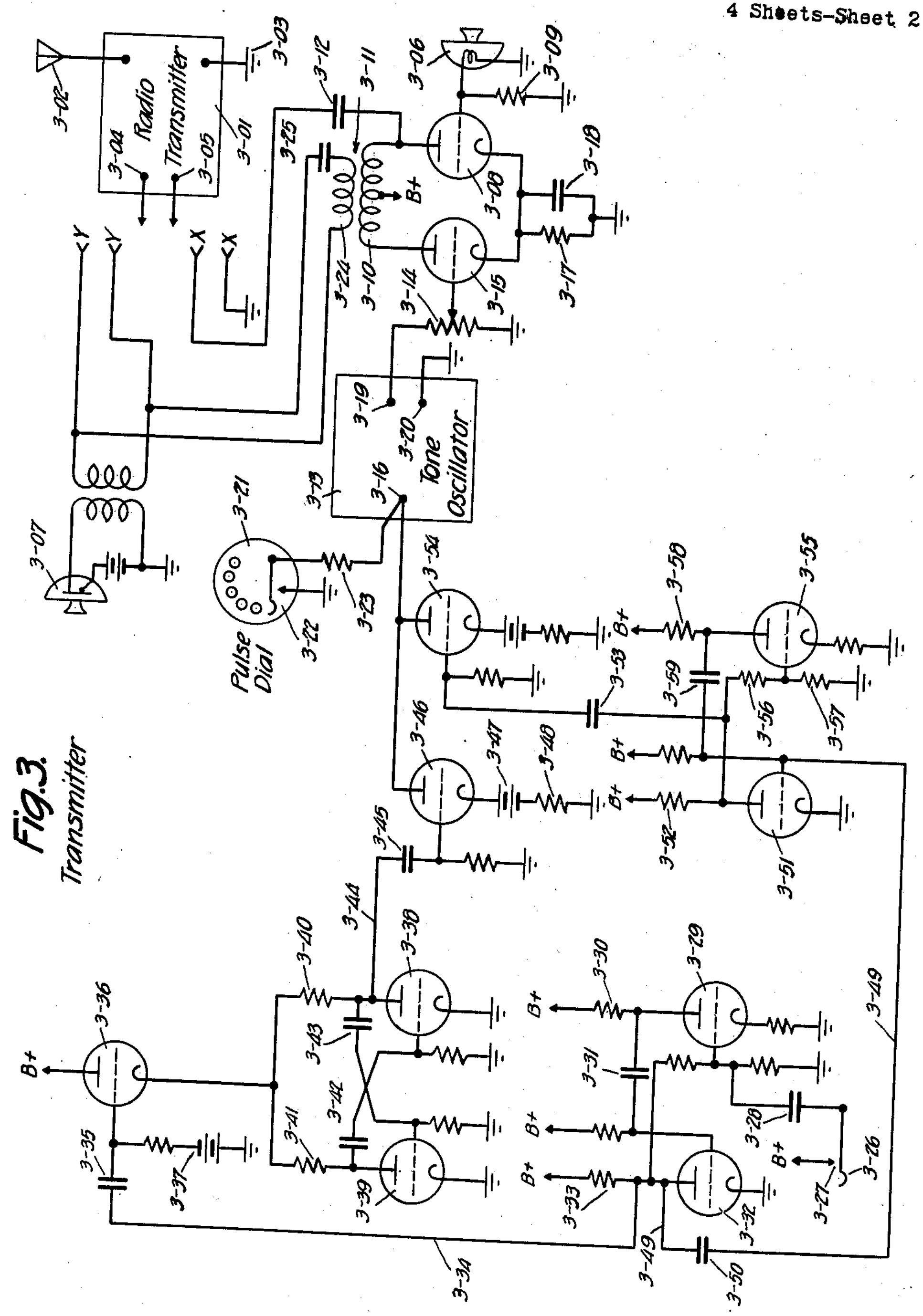
Fig. 3 Transmitter
INVENTOR.
Jack Kendal Kulansky
BY Moser, Nolte, Crews & Berry
ATTORNEYS March 2, 1954 J. K. KULANSKY 2,671,167
SELECTIVE CALLING SYSTEM
Filed Dec. 21, 1946 4 Sheets-Sheet 3
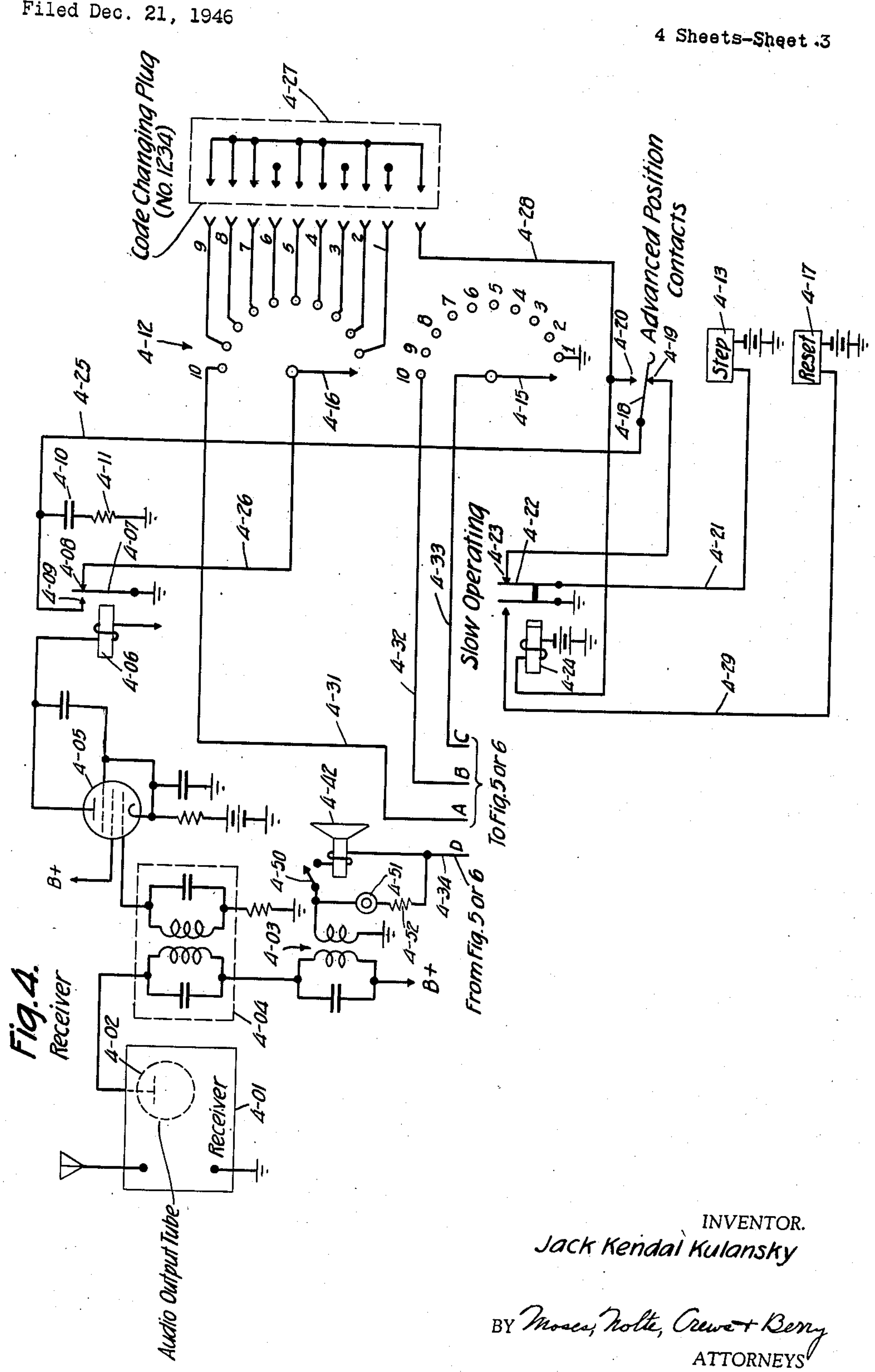
Fig. 4. Receiver
INVENTOR.
Jack Kendal Kulansky
BY Moses, Nolte, Crewe & Berry
ATTORNEYS March 2, 1954 J. K. KULANSKY 2,671,167

SELECTIVE CALLING SYSTEM

Filed Dec. 21, 1946

4 Sheets-Sheet 4

INVENTOR.
Jack Kendal Kulansky

BY Moses, Nolte, Crews & Berry
ATTORNEYS

Patented Mar. 2, 1954

2,671,167

UNITED STATES PATENT OFFICE 2,671,167

SELECTIVE CALLING SYSTEM

Jack Kendal Kulansky, Brooklyn, N. Y., assignor to The Hammarlund Manufacturing Company, Inc., New York, N. Y., a corporation of New York Application December 21, 1946, Serial No. 717,727

6 Claims. (Cl. 250—6)

This invention relates to selective calling systems, and more particularly to systems of a type suitable for use with a central radio transmitter and a plurality of mobile receivers.

An object of the invention is to provide a system in which the receiver of any desired mobile station may be rendered operative under the control of the central station operator.

A further object of the invention is to provide a system in which the signaling frequency for selecting a particular mobile station will not form an appreciably large component of the frequencies used for communication.

Another object of the invention is to provide a distinctive signal for all unwanted mobile stations indicating that the system is in use, thus tending to prevent any unwanted mobile station from interrupting communications between the central station and a called mobile station.

The invention also provides a positive lock-out, which may be used if desired, supplementing the distinctive signal to unwanted stations by cutting off the transmitter control circuit at each such station.

Another object of the invention is to provide a distinctive restoring signal for use at the conclusion of each communication which will indicate at all mobile stations that the system is no longer in use and that any mobile station may call the central station without interference. This restoring signal may also reset the transmitter lock-out.

A further object of the invention is to provide response of either audible and visual signals or both at the called station with facilities for automatically restoring the signals upon answering the call and for likewise restoring the signals by transmission of the distinctive restoring signal, in the event that the called station should not answer.

A further object is to provide an audible signal which will be silenced remotely if the called station does not answer within a reasonable interval together with a visual signal which will remain actuated until reset, thus indicating to the operator that an attempt was made to communicate with him while he was away from the station.

Other and further objects will become apparent upon reading the annexed specification together with the accompanying drawing.

Referring to the drawings—

Fig. 3 shows a schematic circuit drawing of the transmitting facilities of an embodiment of the invention;

Fig. 4 shows a schematic circuit drawing of the receiving and decoding facilities of an embodiment of the invention;

Figure 1:
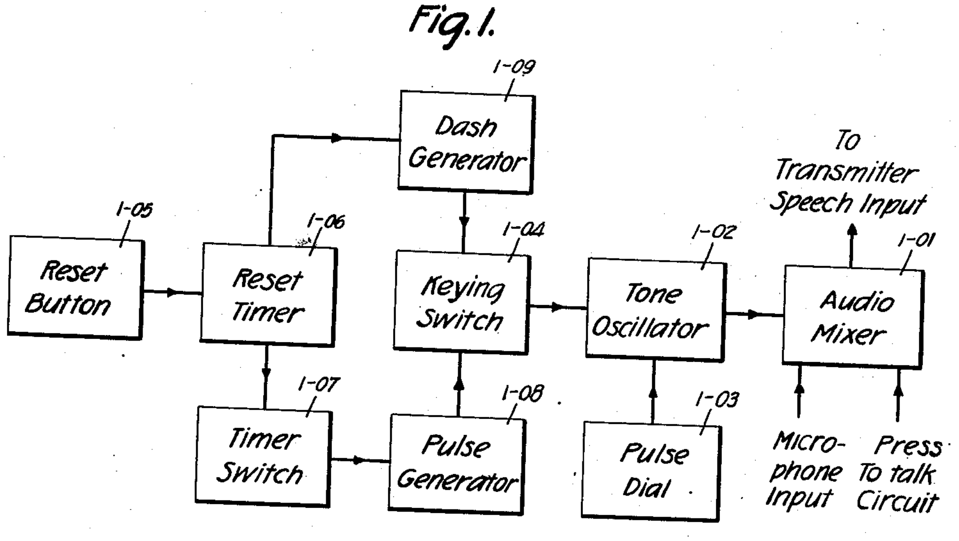
Fig. 1 shows a diagrammatic representation of the facilities at the central station.

In Fig. 1, an audio-frequency mixer 1-01 is interposed between the input of a radio transmitter (not shown) and the usual speech input and press-to-talk circuits. The mixer 1-01 permits the transmitter input to be derived from either the tone oscillator 1-02 or from the speech input facilities without the necessity of switching, and without appreciable interference between these input circuits.

Tone oscillator 1-02 delivers a frequency to the transmitter input which may be selectively received at the mobile stations and which will not be present in the communication frequencies in sufficient magnitude to cause interference with the operation of the selective signaling apparatus. Preferably, a tone frequency such as 6000 cycles may be used which lies above the frequency range required for voice communication and which can be handled by most radio equipment with a minimum of modification, if any modification at all should be required. For systems in which the radio apparatus uses frequency modulation, a signaling tone frequency of the order of 2600 cycles has been found to give good results. A frequency below the speech range may be used, but this involves slower signaling speeds and more bulky components in the apparatus used for filtering the tone frequency to separate it from the speech frequencies.

The tone output of oscillator 1-02 is under control of pulsing dial 1-03 and keying switch 1-04. Pulsing dial 1-03 may be of any well known type such as the device commonly used in dial telephone systems, or it may take any other convenient form. Pulsing dial 1-03 causes oscillator 1-02 to deliver groups of uniformly spaced tone pulses, the number of pulses in each group corresponding to one digit of the call number of the desired mobile station. These pulses are passed through mixer 1-01 to the input of the central station radio transmitter for transmission to all mobile receivers.

At the conclusion of a communication with a mobile station, a reset signal is transmitted by operating reset button 1-05, which in turn initiates a single cycle of operation of reset timer 1-06. At the conclusion of each cycle of operation, timer 1-06 is again in condition to be reoperated by subsequent operation of reset button 1-05.

Reset timer 1-06, in the course of its cycle, first causes timer switch 1-07 to control pulse generator 1-08 to produce a predetermined number of pulses which in turn produce corresponding actuation of keying switch 1-04 causing tone oscillator 1-02 to deliver a corresponding number of tone impulses to mixer 1-01. These impulses may have the same spacing and duration of the impulses produced by pulsing dial 1-03, but preferably they are shorter in duration and delivered at a faster rate than those produced by dial 1-03 within the speed limitations of the pulse-responsive apparatus of the system in order to minimize the restoring time. At the conclusion of transmission of the predetermined number of impulses, reset timer 1-06 next causes dash generator 1-09 to control keying switch 1-04 to produce a prolonged tone impulse by tone oscillator 1-02. The duration of this impulse is sufficient to permit it to be readily distinguished from the pulsing impulses. The number of pulses immediately preceding the prolonged impulse is sufficient to bring all pulse-responsive apparatus of the system to a predetermined condition before the prolonged impulse is transmitted.

Figure 2:
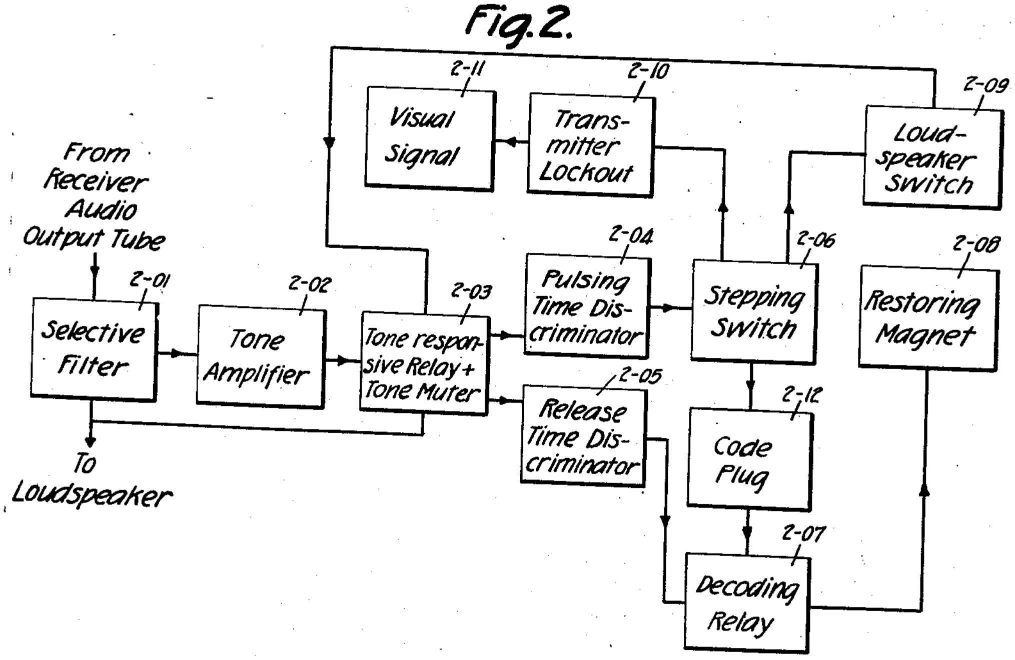
Fig. 2 shows a similar representation of the facilities at each mobile station.

The apparatus utilized at each of the mobile stations is shown diagrammatically in Fig. 2. A selective filter 2-01 may be connected in the circuit of the audio output tube of the mobile receiver, or it may be connected in any other convenient portion of the receiver circuit where it will effectually select the signals transmitted by tone oscillator 1-02 of Fig. 1 from the communication frequencies. The selected signals are amplified by amplifier 2-02 which may be provided with a gain control independent from the control which adjusts the receiver audio output level and the output of amplifier 2-02 is applied to tone-responsive relay 2-03. Relay 2-03 controls circuits linking it both with pulsing time discriminator 2-04 and with release time discriminator 2-05. Tone-responsive relay 2-03 also controls circuits conjointly with loudspeaker switch 2-09 which suppress operation of the loudspeaker circuits. These circuits are arranged to mute the loudspeaker, preventing the tone impulses from being objectionably audible. This is especially desirable during transmission of the restoring impulses described below, since the loudspeaker of at least one mobile station will be in operative condition. Pulsing time discriminator 2-04 controls the operation of restorable stepping switch 2-06 in accordance with the number of tone impulses received, but depending upon constructional details of stepping switch 2-06 pulsing time discriminator 2-04 preferably should not respond to the prolonged impulse transmitted under control of dash generator 1-09. Release time discriminator 2-05 is responsive only to prolonged tone impulses under control of dash generator 1-09. Stepping switch 2-06 will always be brought to its most advanced position from any other position by the predetermined number of pulses produced by timer switch 1-07, the predetermined number of pulses having been selected to be sufficient for this purpose. In this most advanced position, actuation of release time discriminator 2-05 by the prolonged pulse of dash generator 1-09 will cause operation of decoding relay 2-07 which will in turn cause operation of restoring magnet 2-08. Upon operation of restoring magnet 2-08, stepping switch 2-06 returns to its initial position and is again prepared to receive calls. Instead of a restoring magnet and depending upon the construction of the stepping switch 2-06, the switch may be caused to advance in the same direction beyond its most advanced calling position to reach its initial position.

Stepping switch 2-06 is arranged to select the desired mobile station by reaching its most advanced position. The stepping switches of unwanted stations never reach this position. This situation further requires that the sum of the digits of the call numbers of all mobile stations shall be the same and that this sum shall be the number of pulses required to bring each stepping switch from its initial to its most advanced position. The stepping switch contacts at the positions corresponding successively to the several digits of the call number of a particular mobile station are electrically arranged to produce no operation of decoding relay 2-07. In all other positions, if the switch remains in such a position for an interval appreciably longer than the interval between impulses, decoding relay 2-07 will cause operation of restoring magnet 2-08 thereby restoring the stepping switch to its initial position. Upon being thus restored before all the digits of the call number have been transmitted, each such switch will lag behind the switch of a desired station and will fail to reach its most advanced position.

The connections to the stepping switch 2-06 which determine the individual call number of each mobile station are preferably included in removable plug 2-12 or in some other similar device affording convenience in establishing a plurality of removable connections. This arrangement facilitates the replacement of selective equipment in the mobile units by permitting all selective units to be wired identically and interchangeably. In replacing a unit for maintenance purposes the replacement unit is installed and the code plug is transferred from the former unit to the replacement unit.

Any other convenient form of selective apparatus may be utilized which will respond selectively to the dialing in proper sequence of the digits of its call number.

At the selected mobile station, loud speaker switch 2-09 places the receiving facilities in fully operative condition. At each unwanted station, transmitter lockout 2-10 is rendered effective thereby preventing all such stations from interfering with the communication taking place between the central station and the desired station. The existence of this condition is made known to the operator of each mobile station by operation of visual signal 2-11 in conjunction with transmitter lockout 2-10 indicating that the system is busy. Loudspeaker switch 2-09 does not operate at the unwanted stations, thus avoiding annoyance which would otherwise be caused to the operators at the unwanted stations by hearing all communications emanating from the central station. At the conclusion of each communication, the central station operator operates reset button 1-05 initiating the distinctive restoring signal thereby placing all mobile stations in condition to originate calls to the central station or to receive selectively calls emanating from the central station.

Referring to the more detailed circuit diagram of Fig. 3, a radio transmitter 3-01 is provided with an antenna 3-02 and a ground connection 3-03. The radio transmitter may be of conventional type and its details are not a part of the present invention. Transmitter input terminals 3-04 and 3-05 may present either a high impedance or a relatively low impedance and they may be adapted either for a high or a low level of input energy. Where a low energy input level is used, such as from dynamic microphone 3-06, connections marked X are utilized. If a higher level input is in use such as that derived from carbon button microphone 3-07, then connections marked Y will be used. In using the low level circuit, a triode 3-08 has its grid returned to ground through resistor 3-09 and the grid is adapted to be energized by dynamic microphone 3-06. The anode of triode 3-08 is energized from suitable supply voltage designated B+ applied to a tap shown as the mid-point of the primary winding 3-10 of transformer 3-11. The amplified output is passed through blocking capacitor 3-12 through the X connections to input terminal 3-04, terminal 3-05 being grounded. Suitable grid bias for triodes 3-15 and 3-08 is derived from cathode resistor 3-17 and is associated by-pass capacitor 3-18.

As a source of signal tone to be used in selectively calling the mobile or outlying stations, a suitable oscillator 3-13 is employed. An adjustable portion of the oscillator output is derived from potentiometer 3-14 and is applied to the grid of triode 3-15. Anode potential is supplied through a center tap on primary winding 3-10 of transformer 3-11.

Oscillator terminal 3-16 is internally connected to tone oscillator 3-13 in such a manner that a tone output will be delivered to terminals 3-19 and 3-20 upon connecting terminal 3-16 to ground through suitable resistance. Any conventional method of controlling the oscillator output may be employed.

In order to originate a call to a mobile station, pulsing dial 3-21 is operated which closes its contacts 3-22 a predetermined number of times in accordance with each digit of the call number dialed, applying ground to terminal 3-16 through resistor 3-23 once for each contact closure. This causes the tone output to be applied as groups of pulses to the transmitter input through triode 3-15 and winding 3-10 of transformer 3-11. It will be noted that transformer 3-11, in the case of the Y connections, has its secondary winding 3-24 bridged across the transmitter input circuit through a blocking capacitor 3-25. If the X connections are in use, then primary winding 3-10 functions as an auto-transformer and a voltage is generated in the other half of primary winding 3-10 by virtue of this transformer action and is applied through blocking capacitor 3-12 to the transmitter input.

Triodes 3-15 and 3-08 operating in conjunction with transformer 3-11 thus serve as an audio frequency input mixer circuit permitting the tone pulses to be applied to the transmitter input without the necessity of switching. At the completion of a call, a reset signal is transmitted and the manner in which it controls the receiving equipment will be described below in connection with Figure 4. Reset button 3-26 is operated momentarily, closing its contacts 3-27 and applying a positive pulse through capacitor 3-28 to the grid of triode 3-29. This causes a sudden increase in the anode current of triode 3-29 abruptly increasing the potential drop across resistor 3-30. This change in potential produces a negative pulse which is transmitted through capacitor 3-31 to the control grid of triode 3-32 which is normally biased at a slight positive potential and the negative pulse sharply reduces the normal anode current of triode 3-32. This sudden reduction in anode current in triode 3-32 correspondingly decreases the potential drop in resistor 3-33 resulting in a positive pulse which is transmitted via conductor 3-34 and capacitor 3-35 to the grid of triode 3-36. Triode 3-36 which is normally biased substantially to cut off by a suitable potential represented as battery 3-37 then begins to conduct and permits anode current to flow to triodes 3-38 and 3-39.

Triodes 3-38 and 3-39 are symmetrically connected and arranged to produce a succession of pulses during the time that their anode circuit is energized by a conductive condition of triode 3-36. Anode current flowing through resistors 3-40 and 3-41 produces a current flow in both tubes 3-38 and 3-39.

The cross-coupled capacitors 3-42 and 3-43 provide a circuit arrangement which tends to produce a series of sharp well defined impulses at the anode of triode 3-38. Assuming that the anode current of triode 3-38 is increasing, it will be observed that there will be an increasing potential drop across resistor 3-40 which produces, in effect, an increasing negative potential across capacitor 3-43. This increasing negative potential tends to reduce the anode current of the other triode, 3-39. The decreasing anode current in triode 3-39 results in a decreasing potential drop across resistor 3-41 which in turn applies an increasing positive potential across capacitor 3-42 which aids the grid of triode 3-38 to maintain the increasing anode current. This maintenance of positive grid potential at triode 3-38 will cease abruptly when triode 3-39 reaches cut-off, at which point the anode current of triode 3-39 will have become zero. This, in turn will halt the increase in anode current passing through triode 3-38, and the conditions will suddenly be reversed, the anode current now increasing in triode 3-39 and decreasing in triode 3-38. Obviously, this portion of the cycle will proceed in a manner similar to that just described, and the pulsing action will continue so long as triode 3-36 remains conductive.

It is to be noted that the reversal may be occasioned not only by cut-off in one tube, but may be caused by saturation effects in the other tube or by one of the capacitors 3-42 or 3-43 reaching a stable state of change.

Initially, when the two anodes become energized by conduction through triode 3-36, current will build up more rapidly through triode 3-39 since the circuit of triode 3-38 includes greater capacity to ground caused by conductor 3-44 and capacitor 3-45, and this capacity to ground must be charged through resistor 3-40.

By a proper proportioning the values of the circuit constants, a series of impulses will appear at the anode of triode 3-38 which will be transmitted via conductor 3-44 and capacitor 3-45 to the control grid of triode 3-46. Triode 3-46 is normally biased substantially to cut off by a positive potential which may be supplied a battery indicated as 3-47 or which may be supplied by any other conventional means such as by drawing additional current from the anode supply and passing this through cathode resistor 3-48 to maintain the cathode at a potential positive with respect to ground independently of any flow of current in the anode circuit.

Upon receipt of each positive pulse, triode 3-46 becomes conductive and effectively permits the flow of current from terminal 3-16 of oscillator 3-13 to produce a pulse of tone output.

Referring now to triodes 3-32 and 3-29, the positive pulse which appeared on the anode of triode 3-32 and which passed along conductor 3-34 causing triode 3-36 to become conductive, also passed along conductor 3-49 through blocking capacitor 3-50 and applied an increased positive potential to the grid of triode 3-51. Because the grid of triode 3-51 is normally maintained at the anode supply potential, this positive impulse had no effect. However, at the end of a time interval established by the constants of resistors and capacitors associated with triodes arranged. Upon this return to a conductive conductive state. By a proper selection of circuit constants, this change can be made abrupt in nature and the circuits should preferably be so arranged. Under this return to a conductive condition the potential drop through resistor 3-33 suddenly increases resulting in a negative pulse along a conductor 3-49 to the grid of triode 3-51. This negative pulse stops the action of pulsing triodes 3-38 and 3-39 by rendering triode 3-36 non-conductive and it also reduces the anode current in triode 3-51. The reduction of anode current in triode 3-51 has the effect of reducing the potential drop across resistor 3-52 which in turn produces a positive pulse which is applied through capacitor 3-53 to the grid of triode 3-54.

This positive pulse, as in the case of triode 3-46, produces a tone output from oscillator 3-13, the arrangements of triodes 3-46 and 3-54 being substantially identical. As triode 3-51 became less conductive, an increased positive potential was applied to the grid of triode 3-55 through the voltage divider circuit comprising resistors 3-56 and 3-57 and increasing the conductivity of triode 3-55. This increased conductivity in turn produces an increased potential drop across resistor 3-58 resulting in a positive pulse which is applied through capacitor 3-59 to the grid of triode 3-51 tending to offset the negative pulse which originated the cycle.

The time constants of the circuit elements associated with triodes 3-51 and 3-55 are so selected that the negative pulse along conductor 3-49 initiates a prolonged positive impulse applied to the grid of triode 3-54 which produces a prolonged tone pulse at the output of oscillator 3-13.

The operation of the reset circuit may be summarized as follows:

Closure of reset button 3-26 initiates a time cycle in the circuit of triodes 3-32 and 3-29. During this time cycle, capacitor 3-35 is charged in a direction to render the triode 3-36 conductive. The conductive condition of triode 3-36 produces a series of pulses in the circuits of symmetrically arranged triodes 3-38 and 3-39. These pulses control the tone oscillator 3-13 and a series of pulses appears at its output at a rate which is determined by the circuit constants and which is selected to conform to the maximum speed of response of pulse responsive apparatus in the system. At the expiration of the time interval established in triodes 3-32 and 3-29, conduction through tube 3-36 ceases and triodes 3-38 and 3-39 cease to generate pulses. At this time, a starting pulse is applied to the circuit of triodes 3-51 and 3-55 which in turn initiates a subsequent timing cycle between these two triodes, the duration of this latter cycle being sufficient to produce a prolonged tone impulse or dash which appears at the output of oscillator 3-13 by virtue of a conductive condition established in triode 3-54 during this prolonged impulse.

At each mobile station, receiving equipment is provided which may take the form illustrated in Fig. 4. Radio receiver 4-01 is provided with an output tube 4-02 of which only the anode has been shown dotted. The receiver may be of any conventional type and the details of its construction do not form a part of this invention. The anode of the output tube 4-02 is energized through the primary winding of output transformer 4-03 and through filter 4-04. Filter 4-04 is sharply tuned to the frequency of tone oscillator 3-13 of Fig. 3. This frequency is preferably of some value removed from the mean frequency of the communication frequency components. In practice, good results have been obtained using a frequency of 6.0 kc. for the tone oscillator and also with a frequency of 2.6 kc.

Both of these frequencies are well removed from the relatively increased energy components which, in the case of voice communication, lie in the neighborhood of 1000 cycles. Because of the sharp tuning of filter 4-04 relatively little interference is produced with the response of output transformer 4-03 at frequencies other than those in the immediate range of the frequency of the tone oscillator. The output of filter 4-04 is connected to the control grid of the pentode 4-05 which has its screen and suppressor grids connected in conventional manner.

It may be desirable to provide separate amplifiers for the audio output and the tone output of the receiver with individual gain controls. The details of such an arrangement may take any well known and conventional form. For this reason they are not shown in the drawings. The use of separate gain controls permit the volume delivered by loudspeaker 4-42 to be varied to deliver any desired level appropriate to the listening conditions while the tone output is maintained at a relatively fixed level determined to produce optimum response of the selective calling apparatus.

A relay 4-06 is connected in the anode circuit of pentode 4-05 and is provided with an armature 4-07 and contacts 4-08 and 4-09. Contacts 4-09 are protected against undue arcing by a spark suppressor comprising capacitor 4-10 and resistor 4-11. A selector switch 4-12 is illustrated as being provided with two banks of ten terminals. A stepping magnet 4-13 is disposed upon each deenergization thereof to cause counter clockwise rotation of the wiper arms 4-15 and 4-16, the amount of motion being one bank contact for each complete impulse applied to the stepping magnet. Switches of this type are well known and the details of its construction will not be set forth more than is necessary to insure that a switch may be selected which will have the requisite characteristics for correct operation of the circuit. The switch may be reset to its normal position by energization of reset magnet 4-17, the switch being shown in its normal position in the drawing. In all positions except the most advanced position contact 4-18 engages contact 4-19. Whenever switch 4-12 reaches its most advanced position, contact 4-18 disengages contact 4–19 and engages contact 4–20 in preparation for recepit of the prolonged impulse of the restoring signal. The action of the advanced position contacts 4–18, 4–19, 4–20 constitutes an electromechanical pulsing gate permitting energization of the reset magnet 4–17 from the make contact 4–09 of relay 4–06 upon receipt the prolonged pulse of the restoring signal. Each switch will be stepped around to its most advanced position by the preliminary pulses of the restoring signal. Accordingly, each switch will be conditioned for restoration by the prolonged pulse which is of sufficient duration to insure operation of relay 4–24. It should be noted that because switch 4–12 advances upon deenergization of its step magnet 4–13, the circuit of conductor 4–25 will be deenergized as the advanced position contacts are actuated upon reaching the final position and interrupt the circuit of the stepping magnet 4–13 by opening contacts 4–18, 4–19.

Upon receipt of a tone impulse, relay 4–06 closes contacts 4–07, 4–09 energizing step magnet 4–13 through a circuit traceable from battery through step magnet 4–13, conductor 4–21, closed contacts 4–22, 4–23 of slow operate relay 4–24, advanced position contacts 4–18, 4–19, conductor 4–25, contact 4–09 and armature 4–07 to ground. A single impulse thus advances switch 4–12 from its normal to its first position.

At the end of the pulse, armature 4–07 transfers from contact 4–09 to contact 4–08, establishing a circuit via conductor 4–26 to wiper arm 4–16 which is now in engagement with the first bank contact. Connection to each of the first nine bank terminals associated with wiper arm 4–16 is established through a code changing plug 4–27. This plug is readily removable and all connections which determine the code number to which a particular mobile station will be responsive are established within the plug. This permits the apparatus of Fig. 4 to be identical in all respects for each of the mobile stations with the exception of the code changing plug.

Figures 5, 6:
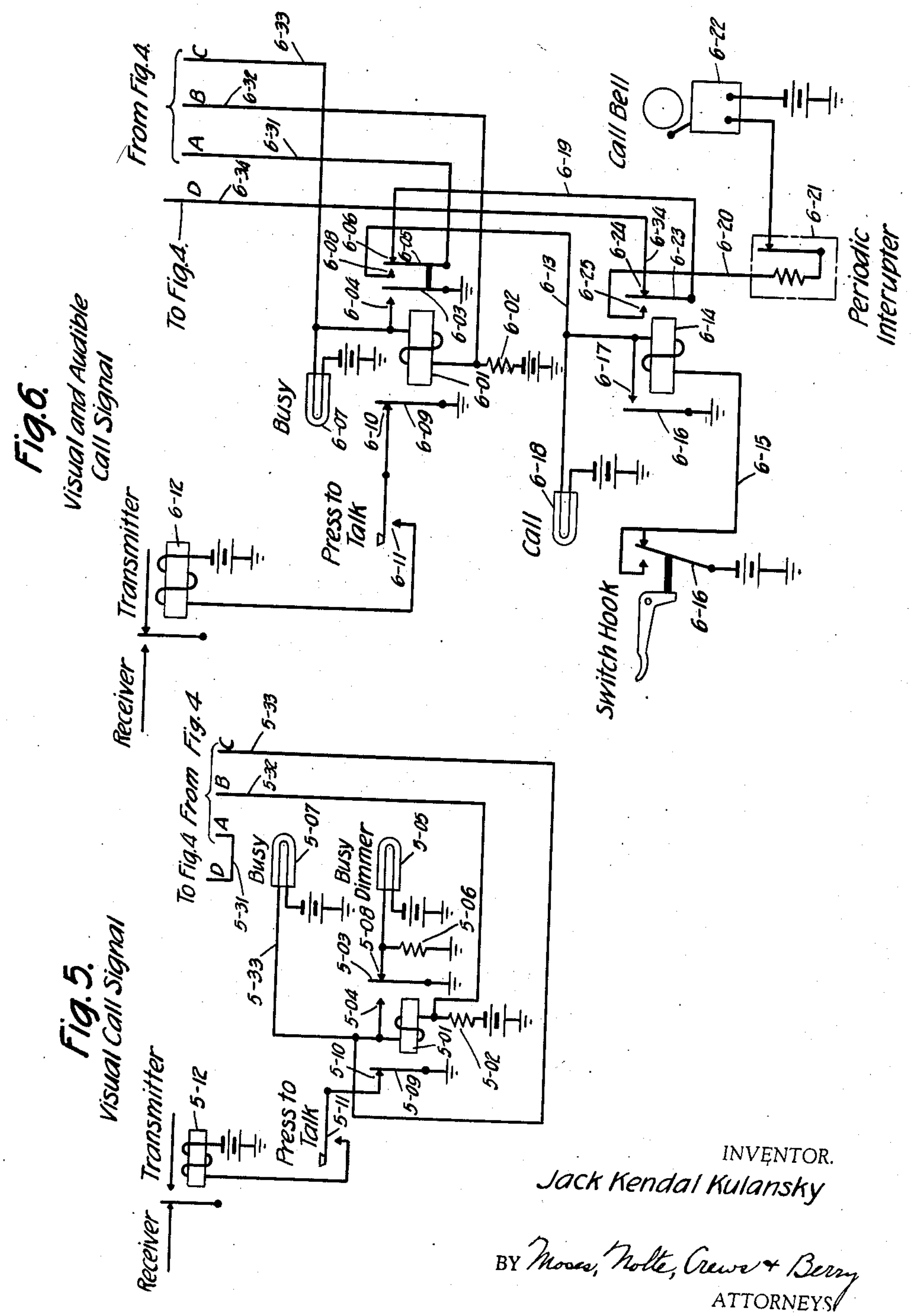
Fig. 5 shows a circuit drawing of a visual signaling arrangement for use with Fig. 4.
Fig. 6 shows a circuit drawing of an arrangement for use with Fig. 4 which combines both audible and visual signals.

The use of such plug connections greatly facilitates maintenance. A receiving unit as shown in Fig. 4 and Fig. 5 or Fig. 4 and Fig. 6 may be removed from a mobile station, where it is usually difficult to work on the equipment, and may be replaced by another identical unit. The code changing plug 4–27 is then transferred from the former unit to the replacement unit, reestablishing the same code number for the mobile station. In the illustration of Fig. 4, code changing plug 4–27 is shown wired for the four digit code number "1234."

In reaching the first selector switch position, wiper arm 4–16 finds no connection at this first terminal in the illustrative example of Fig. 4. At all other mobile stations having a code number whose first digit is other than one, a connection will be established through the code changing plug and conductor 4–28 to slow operate relay 4–24.

The operate time of slow operate relay 4–24 exceeds the maximum pulse duration but is shorter than the interval between consecutive digits of a code number. Therefore, during the interval between digits, at all stations whose code number does not begin with digit 1, relay 4–24 will operate, closing the circuit to reset magnet 4–17 through conductor 4–29 which resets all such selector switches to their normal positions. At all mobile stations in which the first digit of the code number is 1, no such resetting action will occur and the selector switches will remain in their first positions.

Considering the operation of Fig. 4 in conjunction with Fig. 5, in reaching or in passing the first position, at all mobile stations, wiper arm 4–15 establishes a circuit from ground along conductor 4–33 and 5–33 and winding of relay 5–01 through resistor 5–02 to battery. This establishes a locking circuit through armature 5–03 and contact 5–04 which circuit is thereafter independent of further contact between wiper arm 4–15 and its first bank terminal which is grounded. Upon locking in, armature 5–03 breaks its normally closed contacts 5–08 and dims lamp 5–05 by cutting resistor 5–06 in series with the lamp. This dimming action indicates to the operator of each mobile station that the system is busy. If preferred, a lamp 5–07 may be provided which is normally extinguished and which is energized in multiple with the winding of relay 5–01 by conductor 5–33. At the same time, armature 5–09 of relay 5–01 breaks its normally closed contact 5–10 interrupting the circuit of press-to-talk button 5–11 thus rendering it impossible to operate "transmit-receive" relay 5–12. "Transmit-receive" relay 5–12 may be arranged in any desired conventional and well known manner such that upon energization of its winding the mobile transmitter is brought into active condition, the receiver being cut off while the transmitter is in operation. Normally, with the winding of "transmit-receive" relay 5–12 deenergized, the receiver is in operative condition and the transmitter is inactive. Relay 5–12 may include antenna transfer facilities and plate power transfer facilities and it may also comprise dynamotor control circuits for the transmitter plate supply. Unless relay 5–12 can be operated, the mobile transmitter cannot be used. Thus, armature 5–09 and contact 5–10 in breaking the circuit of press-to-talk button 5–11, locks out the mobile transmitter and prevents interfering use of the transmitters of unwanted stations.

As the next digits of the code number are dialed, each selector is reset to normal if it rests between digits on a bank terminal associated with wiper 4–16 which is connected through code changing plug 4–27 to conductor 4–28. In this manner, each selector, except the selector of the desired station will be reset at least once, and cannot be brought to its final position by a total of 10 impulses. In the example shown, the sum of the digits of each code number is equal to ten, and selector 4–12 will reach its tenth position only at the desired station. At every other station it will remain at some intermediate position. Obviously, a selector switch having more than 10 off-normal positions may be used, in which case, the sum of the digits of every code number will be equal to the number of positions of the selector switch disposed between the normal position and the most advanced position.

A loudspeaker 4–42 is provided with a switch 4–50 permitting it to be cut in or out of service at will. Connected in multiple with loudspeaker 4–42 is the receiver 4–51 and series resistor 4–52. Receiver 4–51 is preferably part of the handset (not shown) used for two way communication. Included in this same handset may be a transmitter of suitable design adapted for use with the radio transmitter of the mobile station and for convenience, the press to talk button 5–11 may be incorporated in the handset handle.

These arrangements are well known in the communications art and will not be described in further detail. Series resistor 4-52 serves to reduce the audio frequency level at the loudspeaker to a level suitable for use with receiver 4-51 which is applied directly to the ear. If desired, an independently adjustable potentiometer may be used instead of series resistor 4-52 in conventional and well known manner.

When the selector switch 4-12 at the desired station reaches its most advanced position, receiver 4-51 becomes operative, together with loudspeaker 4-42 provided switch 4-50 is closed. This circuit is established from ground at one side of the secondary winding of audio output transformer 4-03, through series resistor 4-52 and the operating winding of receiver 4-51 along conductors 4-31 and 5-31 to the tenth terminal of the bank of selector switch 4-27 associated with wiper arm 4-16, through wiper arm 4-16, conductor 4-26 and contacts 4-08, 4-07 of relay 4-06 to ground.

At the same time, the operating winding of relay 5-01 is short circuited via conductors 4-33, 5-33, wiper arm 4-15 and its associated tenth bank terminal, and through conductors 4-32, 5-32. The flow of excessive current is prevented by resistor 5-02. As soon as relay 5-01 releases, the circuit of its operating winding is deenergized by the opening of contacts 5-03, 5-04. Closure of contacts 5-03, 5-08 short circuits resistor 5-06 restoring lamp 5-05 to full brilliancy. If busy lamp 5-07 is provided, it is extinguished by the deenergization of the operating circuit of relay 5-01. Closure of contacts 5-09, 5-10 reestablishes the circuit of press-to-talk button 5-11 permitting normal use of the transmitter.

The desired mobile station is now conditioned for communication with the central station. At the other mobile stations, the selector switches have failed to reach their most advanced position. Consequently no loudspeaker circuit is established through wiper arm 4-16 and relay 5-01 remains locked in keeping the press-to-talk circuit disabled and maintaining a busy indication such as dimming of lamp 5-05.

At the conclusion of the communication, a reset signal is transmitted from the central station. As previously explained, the signal comprises a series of pulses followed by a prolonged pulse. These pulses are sufficient in number to bring all selectors to their most advanced positions by the time that the prolonged pulse is transmitted. The prolonged pulse establishes a circuit from ground through armature 4-07 of relay 4-06, conductor 4-25, advanced position contacts 4-18, 4-20 and conductor 4-28 to the operating winding of slow-operate relay 4-24. The duration of the prolonged pulse is sufficient to operate slow-operate relay 4-24 causing it to energize reset magnet 4-17 of selector switch 4-12 via conductor 4-29. This restores all selectors to their normal positions.

At the time when any selector switch is in its most advanced position, contacts 4-07 and 4-08 of relay 4-06 serve as tone-muting contacts with respect to all subsequent tone pulses including the prolonged pulse. At the tenth selector switch position the circuit of loudspeaker 4-42 includes contacts 4-07, 4-08 and is interrupted by each opening of these contacts. Furthermore, since these are normally closed contacts, they open with the first movement of armature 4-07 thus minimizing the time during which each tone pulse will be audible.

It will be observed that all mobile stations may be called simultaneously by dialing "zero" thereby causing the transmission of ten consecutive pulses or by some other single digit number sufficient to bring all selectors to their most advanced positions. Likewise, stations may be called in groups by dialing a number such as 19 which will call all stations whose code number has 1 for the first digit. Similarly, 28 will call all stations whose code numbers begin with 2.

Fig. 6 will now be considered which may be used instead of Fig. 5 with Fig. 4 when both audible and visible signals are desired. The operation of Fig. 4 remains unchanged. Upon establishing the circuit from ground at the first bank terminal through wiper arm 4-14 via conductors 4-33 and 6-33 to the winding of relay 6-01, this relay is energized from battery through resistor 6-02 and establishes a locking circuit through armature 6-03 and stationary contact 6-04. This also lights the busy indicator lamp 6-07 which is energized in multiple with the winding of relay 6-01 and resistor 6-02. Armature 6-09 disengages from stationary contact 6-10 thereby interrupting the energization circuit for "transmit-receive" relay 6-12 through "press-to-talk" switch 6-11. Thus far the operation of Fig. 6 corresponds with that of Fig. 5.

At the called station, selector switch 4-12 reaches its most advanced position and ground from back contact 4-08 of relay 4-06 is applied via conductor 4-26 and wiper arm 4-16 through the last bank terminal to conductors 4-31 and 6-31. Since relay 6-01 is locked in, this ground continues through armature 6-05 and contact 6-08 of relay 6-01 via conductor 6-13 to the winding of relay 6-14 which is energized by battery passing through switchhook contacts 6-16 via conductor 6-15. Relay 6-14 locks in through its armature 6-16 and contact 6-17. Call lamp 6-18 lights by virtue of the ground maintained on conductor 6-13. It should be noted that almost simultaneously with the operation of relay 6-14, relay 6-01 releases. The release of relay 6-01 is slightly delayed, however, because it is produced by a short-circuit caused by engagement of wiper arm 4-15 with its last bank terminal. The operating ground for relay 6-14 is applied upon the release of pulsing relay 4-06 and reaches relay 6-14 sufficiently in advance of the release of relay 6-01 to allow relay 6-14 to lock in through its own contacts 6-16 and 6-17. In connection with the use of Fig. 6 it should again be noted that the selector switch 4-12 must be of a type in which the wiper arms advance upon deenergization of the step magnet 4-13. This action allows the operating ground for relay 6-14 to lock this relay in before the operating circuit is broken by the release of relay 6-01 accompanied by the opening of contacts 6-05 and 6-08. This is made possible by the slight delay in the release of relay 6-01 produced by the short circuiting of its winding and also by the fact that relay 6-14 is of the fast acting type together with the action of the switch 4-12 which applies the operating ground to relay 6-14 and the releasing short circuit to relay 6-01 substantially simultaneously as it moves to its most advanced position.

With relay 6-14 locked in and relay 6-01 released and with ground applied to conductor 6-31 at the called station through wiper arm 4-16 and the final bank terminal, a circuit is completed through contacts 6-05, 6-06 of relay 6-01 along conductor 6-19, armature 6-23 and contact 6-25 to conductor 620 and through periodic interrupter 6-21 to call bell 6-22. The interrupter 6-21 may be of any conventional type such as a thermal interrupter which has been indicated by way of illustration.

Switchhook 6-16 is adapted to support a handset (not shown) used for two way communication. Upon seeing the call light and hearing the call bell, the operator lifts the handset from the switchhook 6-16 momentarily breaking the circuit of conductor 6-15. Because relay 6-14 is of the fast acting type, this short interruption of the circuit of its winding will cause it to open its holding contacts 6-16, 6-17 and release. This extinguishes the call light 6-18 and silences the bell 6-22 by opening contacts 6-24, 6-25. The accompanying closure of contacts 6-23, 6-24 connects the ground on conductor 6-19 through to the loudspeaker 4-42 and to the handset receiver 4-51 via conductors 6-34, 4-34.

In the event that the called station does not answer, the central station operator transmits the restoring signal to free the system for further use. Restoration of the selector switch 4-12 at the called station removes the ground applied to conductors 4-31, 6-31 and thus silences call bell 6-22. Because relay 6-14 is released by lifting the handset (not shown) from switchhook 6-16, it remains locked in maintaining call lamp 6-18 in a lighted condition. Upon returning the operator will note that he has received a call by reason of the fact that the call lamp 6-18 is lighted. The operator, if the system is idle, may then call the central station operator to ascertain what was wanted. If the system is busy, he will necessarily be required to wait, and this condition will be indicated by the busy lamp 6-07.

From the foregoing it will be apparent that a selective system of this type may be used for other purposes than communication. For example, this may be the selective control of various devices in either mobile or fixed outlying receiving stations. Such devices may comprise motors and the control may consist of the starting and stopping or reversing of the motors or the control of the speed of such motors. The control may consist in the display of signals, similarly remotely selectively controlled, or in the case of weapons and the like it may consist in the remote guiding of a mobile mine and the control of the detonation of its explosive charge.

I have described what I believe to be the best embodiments of my invention. I do not wish, however, to be confined to the embodiments shown, but what I desire to cover by Letters Patent is set forth in the appended claims.

I claim:

1. A communication system comprising a radio transmitter and a plurality of outlying radio receivers to be selectively called by pulses from said transmitter, each of said receivers having means responsive to all pulses from said transmitter irrespective of the receiver to be called, means connected with said pulse responsive means to select said receiver for communication in response to a predetermined pulse code, means at said transmitter to transmit the pulse code of any desired receiver to be called, switch means at each of said receivers to prevent the utilization of communication currents received from said transmitter, and means to disable said preventing means at the receiver whose pulse code is the same as that received from said transmitter.

2. A communication system comprising a radio transmitter and a plurality of outlying radio receivers, each of said receivers having selective means to select said receiver for communication in response to selective call signals from said transmitter, means at said transmitter to transmit the selective call signals of the desired outlying receiver, said selective means at each of said receivers being responsive to the selective call signals therefor and also responsive to the selective call signals for each of said other outlying receivers, a call signal indicator at each of said receivers responsive to said selective means of said receiver in response to signals corresponding to said station, but unresponsive to signals not corresponding with said station, and timing means comprising signal producing means at said transmitter to transmit to all said receivers a pre-restoring signal and a restoring signal in predetermined timed relation to each other to restore all of said receivers to normal condition in unison with each other.

3. A communication system comprising a radio transmitter and a plurality of outlying radio receivers, each of said receivers having pulse responsive means connected therewith to select said receiver for communication in response to a predetermined pulse code, means at said transmitter to transmit the pulse code of the outlying receiver it is desired to call, said pulse responsive means at each receiver being responsive to the pulse code of said receiver to select said receiver and being responsive to the pulse code of the other receivers but incapable of selecting said receiver in response thereto, means at said transmitter to transmit a pre-restoring series of pulses of the type employed for calling a receiver, means to transmit a restoring pulse of a different type from said calling pulses in timed relation to said pre-restoring pulses, and means at each of said receivers for restoring said receivers in response to said pre-restoring and restoring pulses.

4. A communication system according to claim 3, having a switch, and means responsive to the operation of said switch to operate said pre-restoring pulse means and said restoring pulse means in predetermined timed relation to each other.

5. A communication system comprising a radio transmitter and a plurality of outlying radio receivers, a call signal and a busy signal at each of said receivers, means at said transmitter to transmit a selective call to a desired outlying receiver to operate the call signal at said receiver, means at said desired receiver to prevent the operation of the busy signal at said receiver, means at said other receivers to operate said busy signal in response to the selective call transmitted to said desired receiver, and means at each of said other receivers to prevent the operation of the call signal thereof in response to the selective call transmitted to said desired receiver.

6. A communication system comprising a central station and a plurality of outlying stations, each of said stations including a radio transmitter and a radio receiver, said receiver at each of said outlying stations having call responsive means connected therewith to select said receiver for communication in response to a predetermined call signal, means at said central station transmitter to transmit the call signal of the outlying station it is desired to call, means at the outlying station called by said central station to enable the transmitter of said called station to communicate with said central station, two call indicators at the receiver of at least one of said outlying stations, two of said call indicators being responsive to the predetermined call signal of said station to indicate when said station is called, means at said called station responsive to discontinuance of the call by the central station, to discontinue the operation of one of said two call signals, means to maintain the operation of the other of said two call signals when said call remains unanswered at the called station, said call responsive means at each of the uncalled outlying stations including means to prevent communication over the transmitter thereof until said central station discontinues its call with said called station.

JACK KENDAL KULANSKY.

References Cited in the file of this patent

UNITED STATES PATENTS

| Number | Name | Date |
|---|---|---|
| 1,464,565 | Espenschied et al. | Aug. 14, 1923 |
| 1,572,756 | Smythe et al. | Feb. 9, 1926 |
| 1,688,454 | Demarest et al. | Oct. 23, 1928 |
| 1,784,645 | Tolson | Dec. 9, 1930 |
| 1,900,499 | Hershey | Mar. 7, 1933 |
| 2,061,699 | Fox | Nov. 24, 1936 |
| 2,100,400 | Von Der Linden | Nov. 30, 1937 |
| 2,184,387 | Kiner | Dec. 26, 1939 |
| 2,383,908 | Bowers | Aug. 28, 1945 |
| 2,417,376 | Newman | Mar. 11, 1947 |
| 2,425,820 | Neiswinter | Aug. 19, 1947 |
| 2,495,452 | Grove | Jan. 24, 1950 |
| 2,501,091 | Preston et al. | Mar. 21, 1950 |
| 2,512,613 | Devaux | June 27, 1950 |

FOREIGN PATENTS

| Number | Country | Date |
|---|---|---|
| 570,415 | Great Britain | July 5, 1945 |